United States Patent [19]

Marshall et al.

[11] Patent Number: 4,900,943

[45] Date of Patent: Feb. 13, 1990

[54] MULTIPLEX TIME DELAY INTEGRATION

[75] Inventors: Charles M. Marshall, North Andover; Jeffrey L. McClelland, deceased, late of Somerville, both of Mass., by Clyde L. McClelland and Joan R. McClelland joint administrators

[73] Assignee: Honeywell Inc., Minneapolis, Minn.

[21] Appl. No.: 293,755

[22] Filed: Jan. 3, 1989

[51] Int. Cl.$^4$ .............................................. H01J 40/14
[52] U.S. Cl. ................................ 250/578; 358/213.23
[58] Field of Search ........................... 250/578, 211 J; 358/213.23, 213.26, 213.29, 213.13, 213.18, 213.31, 213.15

[56] References Cited

U.S. PATENT DOCUMENTS 4,734,582  3/1988  Gibbons et al. .................. 250/578
4,804,854  2/1989  Adachi et al. ..................... 250/578

OTHER PUBLICATIONS

*Electro-Optics*, L. J. Pinson, ©1985, pp. 151-160.
*Optical Radiation Detectors*, E. Dereniak and D. Crow, ©1984, pp. 225-332 and 254-556.

Primary Examiner—David C. Nelms
Assistant Examiner—William L. Oen
Attorney, Agent, or Firm—Kinney & Lange

[57] ABSTRACT

A time-delay and integration arrangement for a plurality of photodetector signals which are directed alternatively along an interconnection arrangement to a corresponding set of acceptance circuit arrangements. The acceptance circuit arrangements transmit that which has been accepted through a transfer signal path to an accumulation circuit arrangement. A composite signal can then be transferred from the accumulation arrangement for further signal processing.

16 Claims, 3 Drawing Sheets

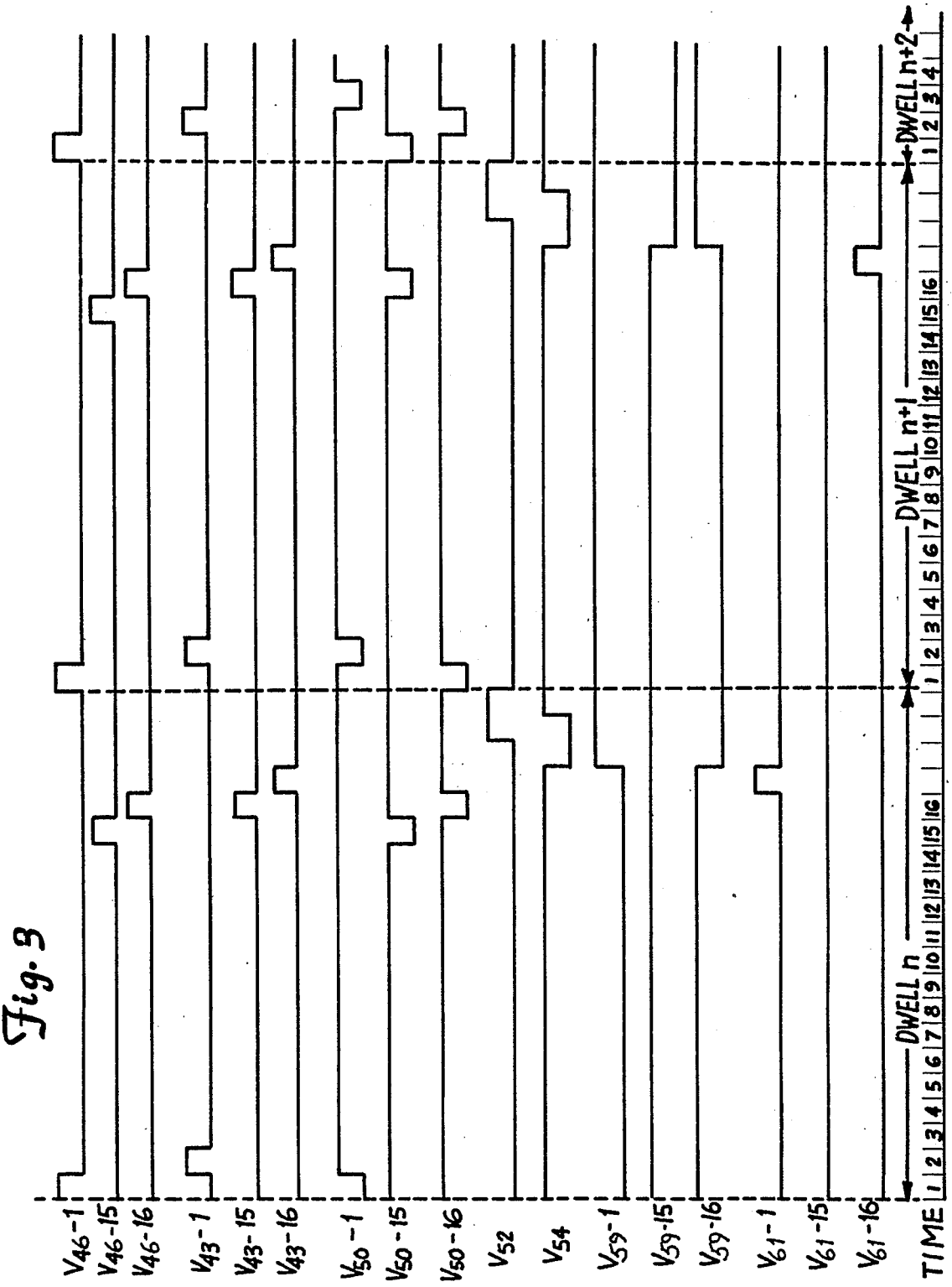

MULTIPLEX TIME DELAY INTEGRATION

BACKGROUND OF THE INVENTION

The present invention relates to time delay integration of focal plane photodetector signals and, more particularly, to photodetector signals formed in the focal plane and transmitted to a monolithic integrated circuit for signal processing.

Acquiring a representation of a field of view at a location remote from the user, or at wavelengths differing from those a user can sense directly, have been goals which have led to the development of electromagnetic radiation sensing and signal processing systems. In other situations, such systems are provided primarily for recordation of fields of view, or primarly to permit manipulation of the field of view images. There are other purposes, and in many systems a combination of these goals are desired.

Various kinds of electromagnetic radiation sensing and signal processing systems have been used for these purposes. Two-dimensional arrays of photodetectors have been used as a basis for sensing over the lateral extent of an image resulting from a field of view. Such systems require large numbers of photodetectors and so are expensive and difficult to implement. An alternative photodetector arrangement is formed by having a single line of photodetectors, and a scanning system which scans in orthogonal directions to cause successive portions of images from a field of view to sequentially impinge on the line of photodetectors. Such systems add the complexity of a mechanical scanning arrangement to cause such image portions to be sequentially presented to the photodetectors, but they also conveniently permit the use of the time-delay integration technique to improve signal-to-noise ratios. An intermediate possibility is to form many lines of photodetectors so that scanning in only one direction need be provided to ease the mechanical complexity but still provide use of time-delay integration.

The time-delay integration technique is especially important in infrared radiation detection. This is because impinging infrared electromagnetic radiation from a field of view usually has the portion therein containing the signal information needed for differentiating objects in that field of view from the general background radiation portion therein that is a small fraction of that background radiation portion, i.e. the useful signals are small so that noise is a significant problem. In this technique, a line portion of an image from the field of view is swept across the line of photodetectors sequentially so that each resolvable element in the image line portion passes over each of the photodetectors in the line thereof in sequence. The output signal from each photodetector for the time a particular resolved element of the image line is thereover is collected to provide a combined signal for that element based on the contributions of each detector. Combining the photodetector signals into the combination signal causes the information portion of the scene element from each photodetector to add directly, i.e. proportionate to the number of detectors in the line, but the noise portion of each element from each photodetector adds in quadrature to be proportional to the square root of the number of detectors to thereby improve the signal-to-noise ratio.

Collecting the output signal from each photodetector at the time a resolvable element in the line image is impinging thereon in effect requires that the rate of sweeping the line image across the photodetectors be matched by the rate at which information from each detector, or information subsample, is collected. Thus, the scanning of the image line must be synchronized with the collecting and combining of subsamples from each of the photodetectors in the line thereof to form a final complete sample for a resolvable element from the image line.

An arrangement used for accomplishing such collection of samples has been to have each photodetector connected to a well in a charge-coupled device so that the charge from the photodetector collected over a period of time can be transferred to the charge-coupled device well. Then, if the transfer rate of charge packets from well to well in the charge-coupled device is synchronized with the line image scan rate across the photodetectors, the charge accumulated in each photodetector for a resolvable element in the line image impinging thereon can be collected in the associated charge-coupled device well after the time that the resolvable element has impinged on the photodetector. This charge is transferred along the charge-coupled device line to the next well connected to the next well connected to the next photodetector on which the resolvable element impinges from which the resulting charge is to be added to the previously collected charge. Thus, at the last photodetector in the line thereof, the corresponding charge-coupled device well will contain the charge supplied from each photodetector due to that particular resolvable element from the line image having been swept over the photodetectors to impinge successively on each. This total collected charge can then be transferred to an output arrangement as the full sample taken of that resolvable element.

Such a system has some drawbacks. Assume, as is typical, that the photodetector elements are formed in a separate material, typically HgCdTe photoconductive sensors, separated from the silicon monolithic integrated circuit in which the charge-coupled devices are formed. Then there must be a separate interconnection from each photodetector to the storage site used in the silicon monolithic integrated circuit to store the charge generated by the electromagnetic radiation impinging on that photodetector by which it is transferred to the charge-coupled device. Thus, there will be a number of interconnections are required between the structure containing the photodetectors and the integrated circuit chip structure containing the charge-coupled device structures.

The charge-coupled device structures must be fabricated in the silicon monolithic integrated circuit immediately adjacent to the storage sites to which the leads from the photodetector structure are connected to permit transfers from these sites to the charge-coupled device. Thus, significant portions of the processing circuitry must in effect be provided in the same area of the silicon monolithic integrated circuit corresponding to the associated photodetector. This limits the size of the storage sites which can be provided for collecting charge from the photodetector induced by electromagnetic radiation impinging thereon. Thus, there will be a limit on the density of photodetectors which can be used or a limit on the amount of charge which can be collected from a photodetector during use, or both. This is particularly a problem for the later wells in the charge-coupled device line thereof which are accumulating the increasingly greater combined charge for a resolvable element in the image line from successive photodetectors.

Keeping the amount of charge which can be collected from each photodector during use small so that the total does not get too large for the charge-coupled device wells requires that the amount of time that charge is accumulated on a photodetector by the resolvable element be kept relatively short. Thus, the operating speed must be increased, and the small charge levels lead to noise components being relatively large with respect to the photodetector signal. In addition, the fabrication of charge-coupled devices in a monolithic integrated circuit which has other kinds of circuitry also provided therein, typically circuits based on metal-oxide-semiconductor field-effect transistors (MOSFET's), require an additional masking step during fabrication. This increases cost, and limits the number of vendors which can supply such integrated circuits as many will not have a process which provides for the additional masking and fabrication step. Thus, there is a desire to provide a signal processing means for photodetector signals which does not lead to limits on the photodetector charge packet signal size, and which can be fabricated in common MOSFET fabrication processes.

SUMMARY OF THE INVENTION

The present invention provides for time-delay and integration of a plurality of photodetector signals, due to electromagnetic radiation being directed to impinge thereon, which are directed alternatively along an interconnection means to a corresponding set of acceptance means. The acceptance means transmits that which has been accepted through a transfer signal path to an accumulation means to form a representation of the various photodetectors' signal results for a resolvable portion of the electromagnetic radiation passing sequentially thereover. The acceptance means may comprise a capacitance as can the accumulation means. Various switching means are used which can be formed on the basis of field-effect transistors. The final representation can be transferred for further signal processing.

BRIEF DESCRIPTION OF THE DRAWINGS

FIG. 3 shows a series of waveforms occuring in connection with the system embodying the present invention.

DETAILED DESCRIPTION OF THE PREFERRED EMBODIMENTS

Figure 1:
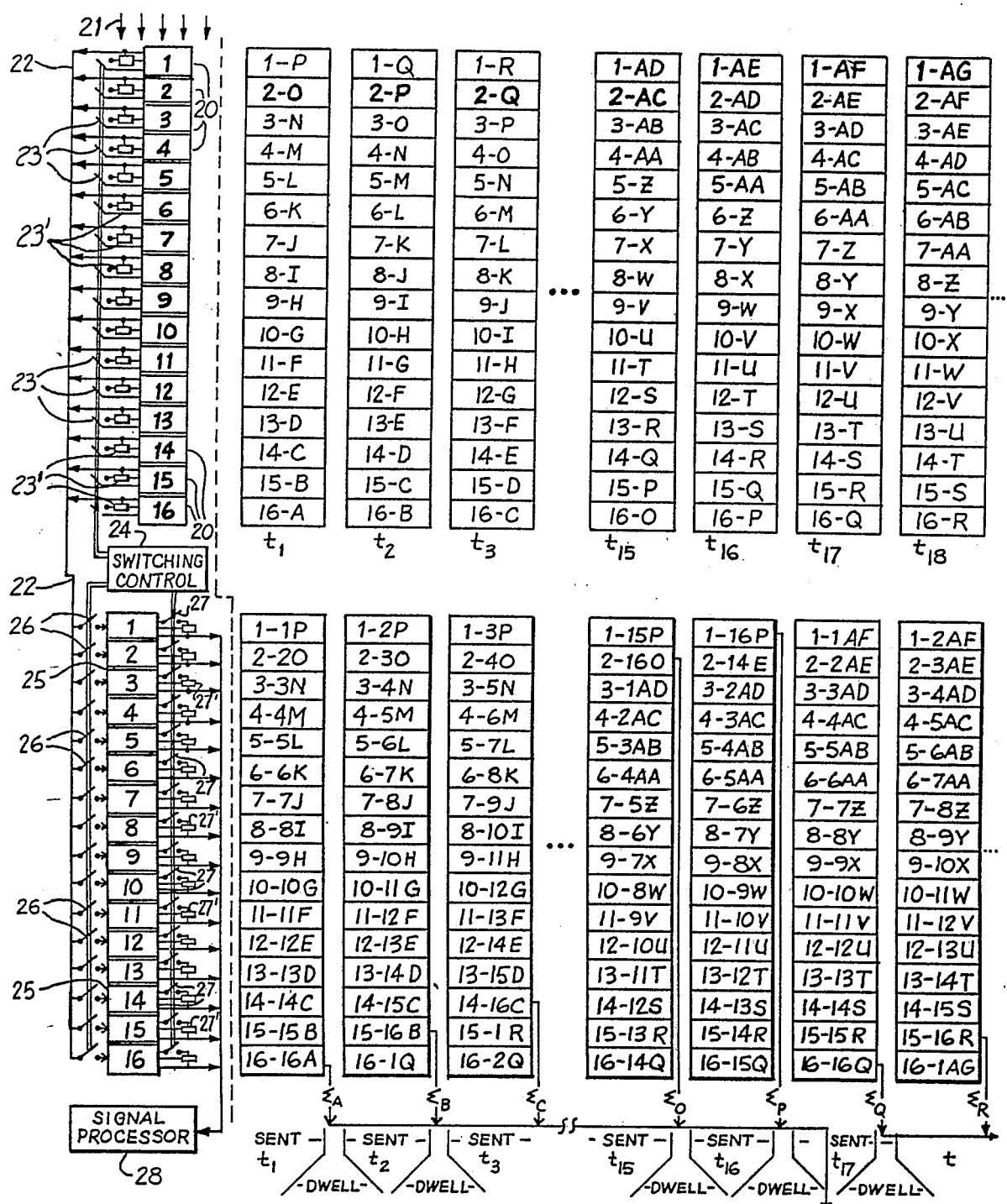
FIG. 1 shows a schematic diagram of a system embodying the present invention and a series of states taken by the system.

FIG. 1 shows, in schematic or block diagram form, a line of sixteen photodetector means, 20, each subject to having electromagnetic radiation, 21, from a line segment in a field of view acquired in an infrared optics arrangement configures so that radiation from this line is repeatedly swept across the photodetecting device in each photodetector means. Electromagnetic radiation 21 from this field of view line is in a pattern that is also approximately the form of a line in having a length much greater than its width. This line radiation pattern is swept, as indicated, in a manner across photodetector means 20 such that its leading edge first impinges on the first of the photodetector means 20, marded 1 in FIG. 1, then over the one marked 2, and so on to finally be swept over the one marded 16. The remaining portions of that line of electromagnetic radiation are similarly swept sequentially over each of photodetector means 20 beginning with the one marded 1 and finishing with the one marded 16 in FIG. 1.

The sweeping of a line pattern of electromagnetic radiation 21 across photodetector means 20 permits resolving that line pattern as a sequentially ordered collection of sixteen pixels. This division of each electromagnetic radiation line pattern into sixteen pixels occurs through sampling of the electric charge generated by the photo detecting device in each of photodetector means 20 as the electromagnetic radiation line is swept thereacross. That is, the charge accumulated in each of photodetector means 20 during the time the electromagnetic radiation line pattern is swept thereacross is divided into sixteen packets of charge, one for each of sixteen equal divisions of the time duration required to sweep the line pattern thereover. Thus, the sixteen packets of charge provided from one of photodetector means 20 during the sweeping of an electromagnetic radiation line pattern 21 thereacross will each be the charge provided by that photodetector in the corresponding one of the sixteen divisions of that sweep time. Each such charge packet represents a sample of the electromagnetic radiation occurring in a portion of that electromagnetic radiation line pattern, and that portion forms a pixel therein.

A voltage signal representing the amount of charge in a pixel charge packet is provided from each of photodetector means 20 along an interconnection line, 22, in a selected order as the result of the actions of a series of switches, 23, each enabling the output of a corresponding voltage controller, 23', to be applied to line 22. There is one of switch 23-controller 23' combination connected to each of photodetector means 20. Switches 23 are under the control of a switching control circuit, 24, which closes these switches alternatively and sequentially to thereby place a pixel representation voltage signal from each corresponding controller 23', derived from its corresponding photodetector means 20, on interconnection 22 at alternative times in a selected sequence.

These pixel representation voltage signals are thus transmitted one at a time in the selected sequence along interconnection 22 to a set of time-delay and integration circuits, 25, with the number of each such time-delay and integration circuits being equal to the number of samples in each imaging dwell of photodetector means 20. Thus, time-delay and integration circuits 25 are also numbered 1 to 16 for this example of providing one integration sample in the time it takes radiation 21 to be swept across each photodetector means 20. Alternatively, a separate sample can be provided to a different time-delay and integration circuit 25 for each of a selected set of fractional parts of a sweep of the electromagnetic radiation line pattern over a photodetector means 20.

A further set of switches, 26, is again under the control of switching control circuitry 24 to close and open them alternatively and sequentially. Thus, a pixel representation voltage signal on interconnection 22 from one of controllers 23' because of the closure of one of switches 23 associated with one of photodector means 20 can be applied to and accepted by any of time-delay and integration circuits 25. This occurs through the closing by switching control circuitry 24 of that one of switches 26 associated with the one of time-delay and integration circuits 25 desired to receive that pixel representation.

To the right of the vertical dashed line in FIG. 1 are a series of pixel subsample provision tabulation diagrams corresponding to photodetector means 20 in the upper row of diagrams to the right of photodetector means 20, and a series of pixel subsample destination tabulation diagrams corresponding to time-delay and integration circuits 25 in the lower row of diagrams to the right of circuits 25. Each vertical pair of tabulation diagrams, one pixel subsample provision tabulation diagram and one pixel subsample destination tabulation diagram, represents the situation occurring in photodetector means 20 and in time-delay and integration circuits 25 at the end of a time a duration in which a pixel in each of the photodetector means 20 has had its corresponding charge accumulation finished to form its subsample charge packet, and a voltage signal based thereon has been transmitted to a corresponding time-delay and integration circuit 25 for acceptance therein. Each subsequent vertical pair of tabulation diagrams to the right of the previous one represents the situation at the next later point in time after the previous pair when the charge packets for another set of pixels has been completed in each of photodetector means 20, and a signal based thereon has been transmitted to another then corresponding time-delay and integration circuit 25.

As a result, the gaps between the vertically ordered pairs represent diagrammatically the "dwell" time in which radiation is impinging on each of photodetector means 20 as a basis to accumulate charge to form a packet to represent a pixel, and the vertical diagram pairs themselves represent points in time when the charge packets have finished being accumulated and signals based thereon have been transmitted. This is indicated in the time axis shown at the bottom of FIG. 1 where "dwell" periods alternate with "send" and each "send" has a time point designation such as $t_1$, $t_2$, etc.

The numbers 1 through 16 in photodetector means 20 designate and sequentially order the individual photodetector means therein as indicated above. The numbers 1 through 16 in time-delay and integration circuits 25 designate and sequentially order the individual circuits therein. The numbering system used for photodetector means 20 has been retained in the blocks of the pixel subsample provision tabluation diagrams to the right of photodetector means 20 in FIG. 1 to indicate the blocks therein corresponding to similarly numbered ones of photodetector means 20 at selected points in time representing the completion of charge accumulation for pixel subsample charge packets. These time points also indicated that the transmission of signals based on these charge packets have been completed.

The diagram at time point $t_1$ is chosen having a pixel designated A, from the electromagnetic radiation 21 in a line pattern that has been swept over photodetector means 20, impinging on the sixteenth one of those photodetector means. That is, the portion of the radiation line pattern, serving as pixel A, has traversed past all of the first fifteen of photodetector means 20 to finally impinge on the sixteenth one of photodetector means 20, and the resulting charge packet corresponding thereto has the charge accumulation therefore completed. Pixel B of electromagnetic radiation 21 is just behind pixel A in the radiation line pattern from the system field of view, and so its corresponding charge packet has the charge accumulation therefor completed at the fifteenth one of photodetector mean 20. Similarly, pixels C through P in the diagram for time point $t_1$ have just had their corresponding charge packets therefore completed at the one of photodetector means 20 that is across the vertical dashed line from it in that diagram.

In addition, voltage signals based on these pixel corresponding charge accumulation packets have been transmitted to selected ones of time-delay and integration circuits 25. This is shown in the pixel subsample destination tabulation diagram to the right of these circuits across the vertical dashed line at "sent" time point $t_1$. The pixel from which the signal was generated and its source and one of photodetector means 20 are noted in the diagram to the right of the numbers designating each of corresponding time-delay and integration circuits 25 by both (i) the letter indicating the particular pixel and (ii) the number indicating the one of photodetector means 20 from which the voltage signal based on the charge packet for that pixel was supplied. Thus, the charge packet for pixel P, accumulated first in photodetector means 20 by time point $t_1$, led to a voltage signal based thereon which was transmitted to the first one of time-delay and integration circuits 25. As a result, there appears in a block designated 1 to the left of the hyphen in the diagram on the right across the vertical dashed line at time point $t_1$ the designation 1P to the right of the hyphen.

Similarly, the signal based on the charge packet accumulated in the sixteenth one of photodetector means 20 by time point $t_1$ has been transmitted to the sixteenth one of time-delay and integration circuits 25 as is indicated by the designation 16A to the right of the hyphen in the sixteenth block of the tabulation diagram at time point $t_1$. In the same manner, the remaining blocks in the tabulation diagram for time-delay and integration circuits 25 at time point $t_1$ each show the origin of the signals received by each of those circuits through designating both the pixel and the one of the photodetector means 20 from which it emanated to reach that circuit.

The pixel subsample provision tabulation diagram for photodetector means 20 next farther to the right at time point $t_2$ shows that pixel A has now shifted past all of the photodetector means and so its designation is absent from the diagram, while pixel B has its charge packet accumulation completed at this time in the sixteenth one of photodetector means 20. Similarly, each of the other pixel charge packet positions in the previous diagram at time point $t_1$ have, in the diagram at $t_2$, shifted sequentially forward one position to the next one in the sequence of photodetector means 20. This can be seen by comparing the diagram at time point $t_2$ with the diagram at time point $t_1$. In addition, a new pixel, designated Q, has completed at time point $t_2$ its accumulation for a subsample charge packet at the first one of photodetector means 20 filling there because of the dropping out at the other end any formation of a charge packet corresponding to pixel A.

Note, however, that the signals based on the charge packet accumulations for each pixel for each of photodiode means 20 at time point $t_2$ are each transmitted to that one of time-delay and integration circuits 25 which received a signal at time point $t_1$ based on the charge packet accumulation at time point $t_1$ for that same pixel. Thus, at time point $t_1$ the charge packet accumulation for pixel P in the first of photodetector means 20 lead to a signal which was transmitted to the first of time-delay and integration circuits 25. At time point $t_2$, pixel P has been swept along to the second one of photodetector means 20, but the voltage signal based on the corresponding subsample charge packet accumulated there is again transmitted to the first of time-delay and integration circuits 25. Thus, the designation 2P is to the right of the hyphen in the block in the tabulation diagram representing the first one of time-delay and integration circuits 25 at time point $t_2$ to indicate that the signal transmitted there was due to pixel P impinging on the second one of photodetector means 20.

As a result, the first of time-delay and integration circuits 25 has had two signals provided at it at time point $t_2$ the value of which it has accumulated in a manner to be described below, and combined them together as also will be described below. One signal is due to the effect of pixel P on the first of photodetector means 20 by time point $t_1$ and the other due to the effect that pixel P had on the second of photodetector means 20 by time point $t_2$. This pattern can be seen to be repeated in the subsequent tabulation diagram vertically ordered pairs further to the right in FIG. 1, each representing a later time point (though some have been omitted as indicated by horizontal dots because of space limitations). Thus, a series of samples is taken of a pixel by successive ones of said photodetector means 20 and these samples are then combined in one of time-delay and integration circuits 25 to thereby provide the desired time-delay and integration of the subsample signals due to each pixel as a means to improve its signal-to-noise ratio.

The last of time-delay and integration circuits 25 at time point $t_1$ had accumulated in it the sixteenth and final subsample signal based on a charge packet accumulation due to pixel A. Thus, all of the sampling of pixel A by each of photodetectors 20 has been completed, and the sixteen voltage signals resulting therefrom have all been accumulated and combined in the sixteenth one of time-delay and integration circuits 25. After that point in time, pixel A is swept beyond all of photodetector means 20 and is no longer of any concern as to its sensing.

Thus, that combined signal from the sixteenth one of time-delay and integration circuits 25 is ready to be transmitted for further signal processing as the combined subsamples forming a single total sample representing pixel A in the system. This is shown by an arrow leading from the sixteenth block in the pixel subsample destination tabulation diagram for time-delay and integration circuits 25 at time point $t_1$ leading to an output signal interconnection pathway. This providing of an output signal is controlled by a further set of switches, 27, at the outputs of time-delay and integration circuits 25. Switches 27 are again under the control of switching circuitry 24 and operate with a further set of voltage controllers, 27'.

Thus, as can be seen in looking at the remaining tabulation diagrams representing time-delay and integration circuit 25, each pixel is sampled by each of the sixteen photodetector means 20 to provide sixteen subsample signals to result in a combined signal total sample for that pixel. Thereafter, this complete or total sample for that pixel is transmitted to output signal processing circuitry, 28. Then, at the next time point shown, a signal, based on a charge packet accumulation due to a new pixel impinging on the first of photodetectors 20, is transmitted to that one of time-delay and integration circuits 25 which at the previous time point provided the last complete sample of a pixel to signal processing circuitry 28. Subsample signals due to that new pixel continue to be sent to accumulate in that time-delay and integration circuit at subsequent time points until sixteen further ones go by and another total sample is provided to signal processor 28.

As an example, the signals due to pixel P are shown being accumulated in the first of time-delay and integration circuits 25 and can be seen to be collected for sixteen time points. Thereafter, the combined signal $\Sigma_P$ is permitted to be provided to signal processing circuitry 28. Since that has been shown here as the last pixel in an electromagnetic radiation line pattern from the system field of view, the provision of the combined signal $\Sigma_P$ also represents the completion of the samples of the pixels in that electromagnetic radiation line pattern. A new line pattern begins with the combined sample for pixel Q, the situation being indicated by a break in the output collection pathway in FIG. 1.

Figure 2:
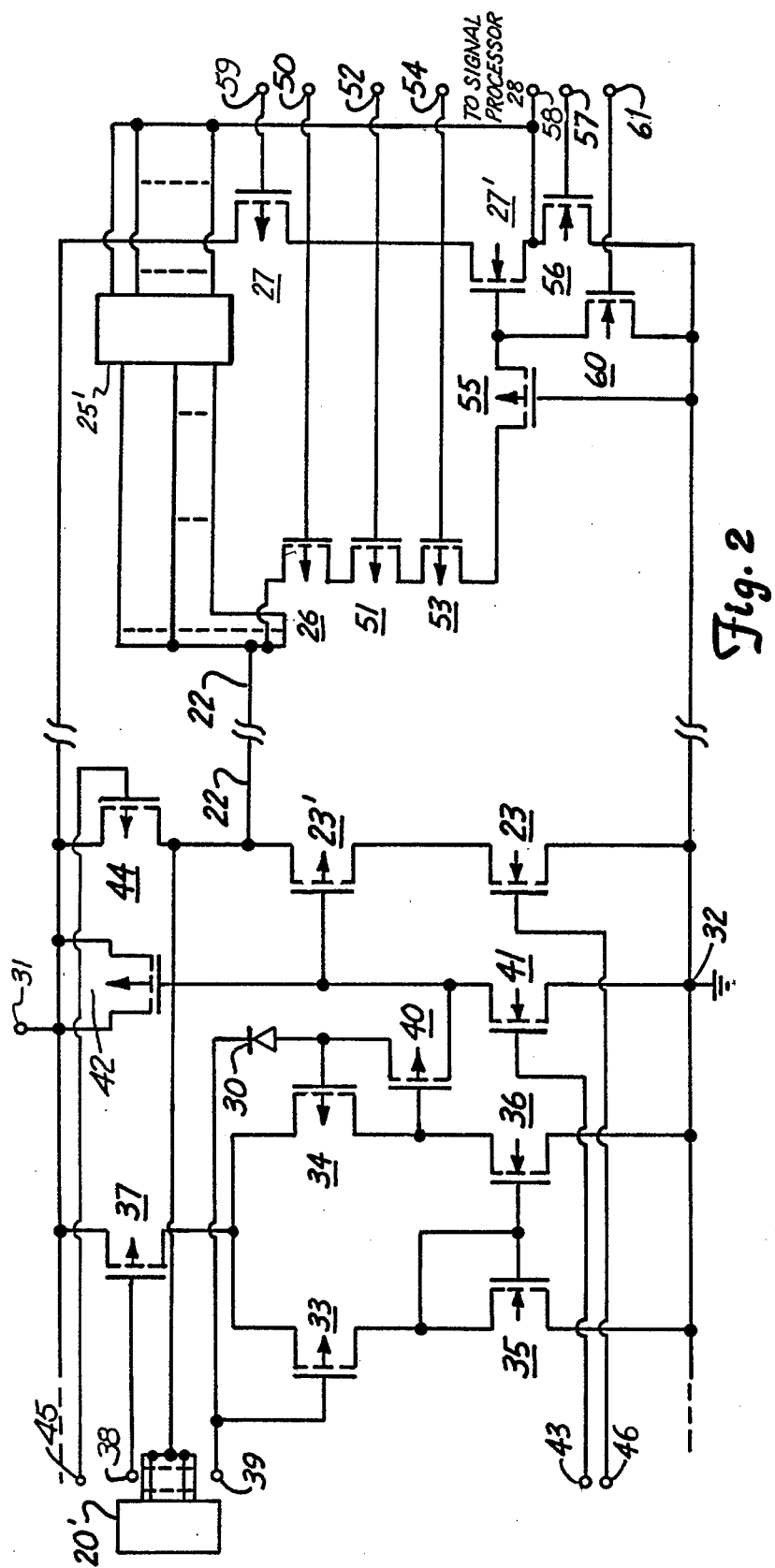
FIG. 2 shows a schematic circuit diagram of a portion of a system embodying the present invention.

A portion of the circuitry of the system of FIG. 1 is shown in FIG. 2. The circuitry for one of photodetector means 20 is shown to the left of the break lines in FIG. 2, and the circuitry for one of time-delay and integration circuits 25 is shown to the right of those break lines in FIG. 2. The remaining ones of photodetector means 20 of FIG. 1 are shown grouped in a box, 20', in FIG. 2 and both switches 23 where voltage controller 23' have been included in block 20' rather than being shown separately as they were in FIG. 1. Again, the remaining ones of time-delay and integration circuits 25 of FIG. 1 have been shown in FIG. 2 included in a block, 25', and switches 26 and 27, and voltage controllers 27', have also been placed in box 25' as opposed to being shown separately as in FIG. 1.

The one of photodetector means 20 of FIG. 1 that is shown in FIG. 2 includes as the photodetector device therein, a photodiode, 30, which is operated as a photovoltaic photodetector. Typically, photodiode 30 is formed in HgCdTe material in a structure such as a chip separate from the silicon monolithic integrated circuit chip in which the remaining portions of the circuitry of FIG. 2 are formed.

Photodiode 30 is connected by interconnections from its structure to an amplifier and charge accumulation circuit formed in the silicon chip and capable of providing a voltage output signal representative of the charge accumulated due to the photocurrent generated by photodiode 30 due to electromagnetic radiation 21 impinging thereon. This circuit operates between a positive voltage supply of typically 5.0 V supplied to a positive voltage terminal, 31, and a ground reference voltage terminal, 32.

The amplifier portion of the circuit comprises a pair of differential amplifier control transistors, 33 and 34, which are each p-channel metal-oxide-semiconductor field-effect transistors (MOSFET's) (though they are typically formed with silicon gates). The collector of transistor 33 is connected to the collector of a differential amplifier load transistor, 35, and the collector of transistor 34 is connected to the collector of a further differential amplifier load transistor, 36. Each of transistors 35 and 36 are an n-channel MOSFET.

The sources of load transistors 35 and 36 are each connected to ground reference terminal 32. The sources of control transistors 33 and 34 are each connected to the collector of an amplifier current source transistor, 37. The source of transistor 37 is connected to positive supply terminal 31. The gate of transistor 37 is shown in FIG. 2 connected to a terminal, 38, which is intended to be connected to a reference voltage typically of 3.80 V.

The gate of control transistor 33 is connected to a further terminal, 39, also intended for connection to a source of reference voltage which is typically 3.50 V. The cathode of photodiode 30 is also connected to terminal 39, and the anode thereof is connected to the gate of control transistor 34. Thus, photodiode 30 for a balanced amplifier would have zero voltage thereacross, though in operation as will be described below there will be some reverse bias voltages therein. The gates of load transistors 35 and 36 are each connected to the collector of control transistor 33.

The substrate connections for the transistors mentioned so far are not expressly shown in FIG. 2. However, the p-channel transistors can be assumed to have their substrates connected to positive voltage terminal 31. The substrates of the n-channel MOSFET's will generally be connected to ground reference terminal 32. Either the p-channel or n-channel transistors are usually formed in the substrate and the others formed in a tub region so that they are electrically isolated from one another in typical complementary metal-oxide-semiconductor (CMOS) field-effect transistor integrated circuit structures. Alternatively, they may be isolated through being formed in oxide isolation structures in integrated circuits.

A further p-channel MOSFET, 40, is connected about control transistor 34 between its collector and its base to sink the photocurrent generated in photodiode 30 by impinging electromagnetic radiation thereon, and pass that current as a controlled current source to discharge a previously charged capacitor. The resulting voltage level on that charged capacitor is then a representation of the total accumulated charge provided thereto by the photocurrent generated by photodiode 30. This action by transistor 40 results in some reverse bias on photodiode 30 as indicated above.

Transistor 40 has its source connected to the gate of transistor 34 and the anode of photodiode 30. The gate of transistor 40 is connected to the collector of transistor 34, and the collector of transistor 40 is connected to the collector of a further n-channel MOSFET, 41, and to the gate of a further p-channel MOSFET, 42. The source of transistor 41 is connected to ground reference terminal 32, and the gate of transistor 41 is connected to a terminal, 43, intended for connection to a source of control signals. These control signals switch transistor 41 between the "on" condition in which it permits transistor 42, acting as a capacitor, to be fully charged to the voltage between terminals 31 and 32, and the "off" condition in which currents from the collector of transistor 40 can discharge transistor 42, serving as a charged capacitor.

Transistor 42 has both of its terminating regions, or source and drain regions, electrically connected to positive supply terminal 31. In this configuration, transistor 42 acts as a MOS capacitor capable of storing charge across the oxide capacitance and the depletion capacitance therein.

In operation, transistor 41 is switched to the "on" condition by its gate control signals to charge transistor 42, serving as a capacitor. Upon completion of that charging, transistor 41 is switched into the "off" condition. Photocurrent generated by photodiode 30 due to electromagnetic radiation 21 impinging thereon, leads to transistor 34 having the effective conductivity between its source and drain sufficiently reduced to cause the voltage on the gate of transistor 40 to be lowered. This voltage on the gate of transistor 40 is lowered sufficiently so that the photocurrent supplied by photodiode 30 is just sunk by the source of transistor 40 and passed through its collector to discharge transistor 42, serving as a capacitor, i.e. transistor 40 operates as a controlled current source.

The resulting voltage change across transistor 42, as a charged capacitor being discharged, is supplied to the base of a further p-channel MOSFET, serving as the photodetector means output voltage controller and so marked 23' in FIG. 2 in correspondence with FIG. 1. The source of transistor 23' is connected to the collector of a further p-channel MOSFET, 44, serving as a current limiting load having its emitter connected to positive supply terminal 31 and its gate connected to a terminal, 45, intended for connection to a reference voltage source. Thus, the voltage remaining across capacitor 42 will appear across the source to gate of transistor 23' and across load transistor 44.

A further n-channel MOSFET serves as the photodetector means output switch and so is marked 23, again in correspondence with FIG. 1. The collector of transistor 23 is connected to the collector of transistor 23', and the source of transistor 23 is connected to ground reference terminal 32. The gate of transistor 23 is connected to a terminal, 46, again intended for connection to a source of control signals.

At a time that there is a desire to provide a voltage signal at interconnection 22 which represents the accumulated charge due to the photocurrent of photodiode 30, transistor 23 is switched into the "on" condition so that current can be passed through current limiting transistor load 44. The voltage across transistor 42, serving as a capacitor, is apportioned between the gate and source of transistor 23' and load transistor 44 with the voltage between the gate and source of transistor 23' being relatively constant near its threshold value. The voltage across transistor 23' (and the very small voltage across transistor 23) essentially represents the amount of voltage reduction across transistor 42, serving as a capacitor, which has resulted from its discharge plus the relatively constant gate to source voltage of transistor 23', since it and the voltage remaining across transistor 42 must equal the voltage on terminal 31. This voltage across transistors 23' and 23 is applied to interconnection 22.

At other times, transistor 23 is placed in the "off" condition, and the voltage on line 22 will be set by that one of the other photodetector means 20 of FIG. 1 located in block 20' of FIG. 2 which is desired to then have its output voltage placed on interconnection 22. That photodetector means output will thus place the collector of transistor 44 its output voltage since transistor 23 in the shown photodetector means is an open circuit and draws no current through load transistor 44 or transistor 23'.

FIG. 3 shows a control signal timing diagram for the system of FIG. 2. As can be seen there, the time axis has been divided into a series of successive dwell periods, each typically around 25 $\mu$s in length. Each of these dwell periods in turn is broken up into 20 equally divided time intervals. The first three graphs show the control signals $V_{46}$-1, and $V_{46}$-16 applied to terminal 46 for the first, fifteenth and sixteenth ones of photodetector means 20 of FIG. 1, each having the same circuit arrangement as is shown to the left in FIG. 2.

As can be seen, the control signal for controlling the placing of a pixel subsample voltage value signal on interconnection 22 for the first photodetector means is provided so that the pixel signal is always placed thereon in the first time interval of each dwell period. Similarly, the signal from the fifteenth photodetector means and the sixteenth photodetector means are placed on line 22 in the fifteenth and sixteenth time intervals of each dwell period. Thus, each of photodetector means 20 provides a signal on interconnection 22 in the numbered time interval of each dwell period corresponding to its position in the line of photodetector means 20. The remaining four unnumbered time intervals in each dwell period allow time for various other signal manipulation steps.

The next three graphs show the voltage at terminal 43 for the first, fifteenth and sixteenth ones of photodetector means 20. This is the signal which controls the recharging of transistor 42, serving as a capacitor, through switching transistor 41 between the "on" and "off" conditions. As can be seen, this capacitor is recharged in the first time interval in a dwell period after the time interval in which the photodetector means in which it is provided has placed a signal on interconnection 22. As indicated above, upon the completion of the switching "on" of its transistor 23 by a signal on terminal 45 for each of the photodetector means, that photodetector means again has its photodetector 30 begin to discharge the recharged capacitor formed by its transistor 42.

The voltage signal on interconnection 22 is accepted by that one of time-delay and integration circuits 25 of FIG. 1 having its switch 26 closed to permit the voltage signal to pass into that circuit. FIG. 2 shows, at the right of the break lines, one of time-delay and integration circuits 25 of FIG. 1 in circuit schematic detail with the remaining ones of these circuits, as indicated previously, being in block 25'. A p-channel MOSFET in the time-delay and integration circuit shown serves as its switch 26 of FIG. 1, and so that MOSFET has been designated 26 in FIG. 2. The source of transistor 26 is connected to interconnection line 22, and the gate thereof is connected to a terminal, 50, which is intended for connection to a source of control signals. These control signals place transistor 26 into the "on" condition when a voltage signal on interconnection 22 is to intended pass into the rest of the time-delay and integration circuit shown to the right in FIG. 2. Transistor 26 is placed in the "off" condition when the voltage provided on interconnection 22 is to pass into others of time-delay and integration circuits 25 of FIG. 1 and placed in block 25' in FIG. 2.

The output or pixel voltages of circuits from each of photodetector means 20 of FIG. 1 are placed alternately and successively on interconnection 22 for a fixed time period each, as can be seen in the first three waveforms in FIG. 3. Thus, the switching of each of the transistors 26 associated with a corresponding time-delay and integration circuit 25 of FIG. 1 must be arranged in such a manner so as to give effect to the desire to meet the pattern of pixel voltage signal destinations set out in the pixel subsample destination tabulation diagrams to the right of time-delay and integration circuits 25 in FIG. 1 at various points in time.

The three graphs labeled $V_{50}$ each represent the control signal applied at a terminal 50 to the base of its transistor 26. The signals shown are the ones for such a terminal and transistor in the first, fifteenth and sixteenth ones of switches 26 providing selectively made connections to the first, fifteenth and sixteenth ones of time-delay and integration circuits 25, respectively. As can be seen, control signal $v_{50}$-1 permits passing into the first of time-delay and integration circuits 25 of voltage signals from interconnection 22 provided by the first of photodetector means 20 in the nth dwell period. Control signal $v_{50}$-1 permits passing into the first of time-delay and integration circuits 25 of voltage signals from interconnection 22 provided by the second one of photodetector means 20 in the n+1 dwell period. Similarly, a voltage signal across interconnection 22 from the third one of photodetector means 20 is permitted by this control signal to pass into the first of time-delay and integration circuits 25 in the n+2 dwell period, and so on.

Thus, a pixel, e.g. pixel P of FIG. 1, impinging on the first photodetector means, indicated by 1-P in FIG. 1, provides a charge accumulation or packet leading to a voltage signal which is passed through interconnection 22 into the first one of time-delay and integration circuits 25, indicated as 1-1P in FIG. 1, in the first time interval of the nth dwell period. As that pixel moves to the second one of photodetector means 20 for the n+1 dwell period, indicated by 2-P in FIG. 1, the first of time-delay and integration circuits 25 should receive a voltage signal based on the charge generated by that pixel at this second photodetector means indicated by 1-2P in FIG. 1, so that this pixel subsample is combined with the first. That is just what occurs in the circuitry of FIG. 2 as shown by the timing of control signal $v_{50}$-1 in FIG. 3. This same general pattern is followed by those switches 26 associated with the fifteenth and sixteenth ones of time-delay and integration circuits 25 as can be seen in the graphs for control signal voltages $v_{50}$-15 and $v_{50}$-16.

As can further be seen for these switching control signals for the fifteenth and sixteenth ones of time-delay and integration circuits 25, after the switching transistor 26 therefor has permitted acceptance of a voltage signal across interconnection 22, based on the charge accumulated for a pixel impinging on photodiode 30 of the sixteenth one of photodetector means 20, the switch sequence begins over and next permits accepting a voltage signal based on the charge accumulating for a new pixel impinging on the photodiode of the first one of photodetector means 20. The successive voltage signal provided as a result of this new pixel impinging on successive ones of the photodiodes of the sequence of photo diode means 20 are permitted to be accepted in succession by the same one of switches 25 throughout this series of pixel impingements.

A voltage signal passed by transistor 26 to the circuit to the right in FIG. 2 charges a further p-channel MOSFET, 51, which can be selectively operated as a capacitor. This occurs through having its gate connected to a terminal, 52, which is intended for connection to a source of control signals which can selectively switch that gate to ground. The charge stored thereon is proportional to the value of the voltage occurring on interconnection 22 applied through transistor 26 in the "on" condition to transistor 51 with terminal 52 connected thereto at ground. Alternatively, terminal 52 can be supplied with a selected voltage with respect to ground to reduce the charge provided to transistor 51 which, in effect, can be chosen so as to subtract a signal portion representing the radiation background signal. The charge is stored in the oxide and depletion capacitances of transistor 51.

As can be seen for control signal waveform voltage $v_{52}$ of FIG. 3, which is applied to terminal 52 in each of time-delay and integration circuits 25, the gate of transistor 51 is kept at ground for all but the last two time intervals in a dwell period. This holds the charge impressed thereon in one of the earlier time intervals in the dwell period until approximately the end of that dwell period. At that point, none of switches 26 connected to interconnection 22 are in the "on" condition, and so any transfer on transistor 51 must be to some point further along in the time-delay and integration circuit shown in FIG. 2, as transfers the other way are blocked by switch 26 being in the "off" condition. That is, switch 26 for each time-delay and integration circuit at the end of each dwell period isolates the remaining parts of that circuit from interconnection 22.

Just before the gate of transistor 51 is moved from ground, another p-channel MOSFET, 53, acting as a transfer switch and having its source connected to the collector of transistor 51, is switched into the "on" condition. This permits transferring or passing the charge stored on transistor 51, serving as a capacitance, to a further point in the time-delay and integration circuit of FIG. 2. This transfer is controlled by the gate of transistor 53 being connected to a terminal, 54, which again is intended to be connected to a source of control signals.

The charge on transistor 51, serving as a capacitor, is passed by transistor 53, serving as a transfer switch, to a further p-channel MOSFET, 55, also serving as a capacitor in the circuit of FIG. 2. The drain of transistor 53 is connected to the source of transistor 55, and the gate of transistor 55 is connected directly to ground reference terminal 32. Transistor 55, serving as a capacitor, is constructed to have a much greater gate area than is transistor 51 so that it has a considerably larger capacitance. Each closing of a switch 26 permits a voltage signal representing a pixel subsample to come into the associated one of time-delay and integration circuits 25 across interconnection 22 with each such subsample being due to the same pixel but provided from a different photodetector means each time. Each voltage signal induces a proportionate charge on transistor 51 which is transferred through switch 53 to accumulate in the capacitance provided by transistor 55. In this manner, these various subsample charge packets are combined to provide a single total sample charge packet for that pixel in the manner described in connection with FIG. 1.

The waveform in FIG. 3 designated $v_{54}$ operating the gate of transistor 53 shows near the end of each dwell period an overlap with the operation of transistor 51. Transistor 51 is in the "on" condition in serving as a capacitor for nearly the entire time dwell period while transistor 53 is "of" for nearly the entire time dwell period. Transistor 54 is switched to the "on" condition in the last part of the dwell period before transistor 51 is switched "off" so that both are in the "on" condition together for a time interval and then transistor 51 is switched to the "off" condition during the time that transistor 53 is still in the "on" condition. This assures that all of the charge induced in transistor 51, serving as a capacitor, by the pixel voltage signal from each photodetector singly, as an input signal representing the subsample charge of each pixel that is accepted through storing it on transistor 51, serving as a capacitor, is transferred to transistor 55, serving as the accumulation capacitor. By so accumulating each such subsample charge, a complete pixel sample is formed by combining the subsample charges induced by the voltage signals from each of photodetector means 20 for that pixel.

The remaining circuitry on the right in FIG. 2 associated with a time-delay and integration circuit 25 of FIG. 1 is the output switching and voltage control circuitry, and the reset circuitry for the accumulation capacitor formed by transistor 55. An n-channel MOSFET, 56, has its source connected to ground reference terminal 32 to form a current sink. The gate of transistor 56 is connected to a terminal, 57, intended for connection to a reference voltage source.

A further n-channel MOSFET serves as the voltage output controller and so is labeled 27' in FIG. 2 in accordance with the designation in FIG. 1. The drain of transistor 56 is connected to the source of transistor 27'. The gate of transistor 27' is connected to the drain of transistor 55, serving as an accumulation capacitor. After charge transfer control transistor 53 has been placed in the "off" condition, the charge on transistor 55, serving as the accumulation capacitor, leads to a voltage between its gate and its terminating regions, serving as source and drain, which voltage is proportional to that charge and the effective capacitance of transistor 55. This voltage is supplied to the gate of transistor 27'.

As a result, that voltage less the threshold voltage for transistor 27' can appear at an output terminal, 58, connected to the source of transistor 27' and the collector of transistor 56. That voltage will appear if a further p-channel MOSFET, serving as switch 27 of FIG. 1, is in an "on" condition to permit current to flow to the current sink therebelow in FIG. 2 as just described. That transistor is labeled 27 in FIG. 2 in accordance with FIG. 1, and has its collector connected to the collector of transistor 27'. The source of transistor 27 is connected to positive supply terminal 31. The gate of transistor 27 is connected to a further terminal, 59, intended for connection to a source of control voltage. That control voltage permits transistor 27 to be in the "on" condition only at the completion of the accumulation on transistor 55, serving as the accumulation capacitor, of a set of charge subsamples each based on one of a succession of voltage signals from a corresponding one of the sixteen photodetector means 20 of FIG. 1 due to a common pixel being successively swept over each. The completion of this accumulation forms a complete complete sample of that pixel, a representation thereof being what switch 27 permits to reach output terminal 58.

The three signal waveforms labeled $v_{59}$-1, $v_{59}$-15 and $v_{59}$-16 of FIG. 3 applied to the corresponding terminals 59 indicate the timing of the switching into the "on" condition of those switch transistors 27 associated with the first, fifteenth and sixteenth ones of time-delay and integration circuits 25 of FIG. 1. In dwell period (n−1) immediately before dwell period n, the sixteenth subsample of a pixel had been accumulated in the accumulation capacitor of the first of time-delay and integration circuits 25 of FIG. 1. As a result, its switch 27 was switched into the "on" condition toward to the end of that dwell period as can be seen in the waveform for signal voltage $v_{59}$-1, and kept in the "on" condition well into dwell period n. This is acceptable switching since there is no connection made between the accumulation capacitor formed by transistor 55 and the acceptance capacitor formed by transistor 51 of FIG. 2 until very nearly the end of dwell period n when transistor 53 is switched into the "on" condition as indicated in the waveform labeled v₅₄.

Thus, the voltage value representing a total sample of the pixel is kept at the output for a time nearly equal to the duration of a dwell period. Since terminal 58 is provided to a multiplexer at the input of signal processor 28, this time duration permits the multiplexer to have the time to direct signals representing total samples of pixels for each of the other lines of photodetector means over which other electromagnetic radiation line patterns from the system field of view are also being swept.

As can be seen in FIG. 3, sixteen subsamples have been accumulated in the accumulator capacitor for the sixteenth one of time-delay and integration circuits 25 of FIG. 1 in dwell period n. Thus, the waveform designated v₅₉-16 shows that its transistor 27 is switched into the "on" condition at the end of dwell period n and kept "on" until near the end of dwell period n+1 to transfer a representation of the total sample of another pixel. Similarly, transistor 27 of the fifteenth one of time-delay and integration circuits 25 can be seen in the graph labeled v₅₉-15 of FIG. 3 to be switched into the "on" condition at the end of dwell period n+1 to transfer a representation of the total sample of yet another pixel.

A further n-channel MOSFET, 60, is provided across the accumulation capacitor formed by transistor 55. The source of transistor 60 is connected to ground terminal 32, and the drain thereof is connected to the drain of transistor 55 and the gate of transistor 27'. The gate of transistor 60 is connected to a further terminal, 61, which is intended for connection to a source of control signals. Transistor 60 is switched into the "on" condition at the end of the time in which a corresponding transistor 27 in one of time-delay and integration circuits 25 completes its time in the "on" condition for the purpose of placing the value of a representation of a total sample for a pixel at terminal 58 for subsequent provision to signal processor 28.

Thus, the waveform designated v₆₁-1 shows that the transistor 60 in the first one of time-delay and integration circuits 25 of FIG. 1 is switched into the "on" condition in the last time interval before the transistor 27 in that circuit is switched from the "on" condition to the "off" condition as indicated in the waveform designated v₅₉-1. Similarly, the waveform designated v₆₁-16 shows that the transistor 60 in the sixteenth one of time-delay and integration circuits 25 of FIG. 1 is switched into the "on" condition in the last interval that transistor 27 of that circuit is in the "on" condition before being switched into the "off" condition as indicated in the waveform designated v₅₉-16. The transistor 61 in the fifteenth one of time-delay and integration circuits is not shown switching into the "on" condition anywhere in the dwell period shown in FIG. 3 as is indicated in the waveform designated v₆₁-15.

As can be seen in FIG. 2, there is no requirement for the right-hand circuitry involved with time-delay and integration circuits 25 of FIG. 1 to be located near the circuitry on the left associated with photodetector means 20 of FIG. 1. That is, interconnection 22 can be relatively long in the monolithic integrated circuit chip in which all of these components are formed other than photodiode 30 which, as indicated above, is typically formed on a separate chip in HgCdTe material.

Thus, the location at which the leads from the photodiodes 30 in each of photodetector means 20 of FIG. 1 reach the silicon monolithic integrated circuit chip, in which the remaining portions of the circuitry of FIG. 2 are formed, need only have the circuitry in the part to the left in FIG. 2 provided at that location. This arrangement will reduce the amount of noise corrupting this small signal from the photodiode before that signal is converted by that circuitry to a signal of larger value, and leaves more integrated circuit chip surface area for the other circuitry involved with time-delay integration. The only capacitance which needs to be provided there is the capacitance supplied by transistor 42 to permit the accumulation of photocurrent from photodiode 30 in proportion to the intensity of the electromagnetic radiation impinging thereon to form a subsample. The much larger accumulation capacitance formed by transistors 55 can be placed elsewhere on the monolithic integrated circuit chip and does not, as a result, have the same sort of geometrical limits which ensue if that capacitance must be placed very close to the point where the leads from photodiode 30 are interconnected into the silicon monolithic integrated circuit signal processing chip.

Although the present invention has been described with reference to preferred embodiments, workers skilled in the art will recognize that changes may be made in form and detail without departing from the spirit and scope of the invention.

What is claimed is:

1. A method for providing time-delay integration of each of a plurality of photodetector means signals induced by electromagnetic radiation from a selected field of view impinging on an ordered array of a plurality of photodetector means, said method comprising:
   directing electromagnetic radiation from a selected portion of said field of view to move across and impinge successively on each said photodetector means in said array in that order in which said photodetector means occur in said array;
   providing at an output of each of said photodetector means a sequence of corresponding photodetector output indicator values with each of said photodetector output indicator values of a said photodetector means representing that amount of said electromagnetic radiation that has impinged on that photodetector means during at least part of that selected dwell duration which has elapsed since that photodetector means provided its immediately previous photodetector output indicator value;
   providing during each said dwell duration conductive signal paths alternatively between each of said photodetector means outputs and inputs of a plurality of acceptance means through an input bus interconnection means electrically connected therebetween, said plurality of acceptance means each being capable of receiving over a said conductive signal path through said input bus interconnection means a representation of a said photodetector output indicator value and storing same;
   providing a subsample transfer signal path through each of a plurality of subsample transfer interconnection means each electrically connected between an output of a said acceptance means in said plurality thereof and an input of a corresponding one of a plurality of accumulation means after each receipt by that said acceptance means of a said representation of a said photodetector output indicator value, said plurality of accumulation means each being capable of receiving over its subsample transfer signal path through its corresponding subsample transfer interconnection means a transfer representation of each of those said representations of said photodetector output signal indicator values received by its corresponding acceptance means, and each being further capable of combining each said subsample transfer representation received thereby in a selected accumulation number of said dwell durations, forming an accumulation period, with any said subsample transfer representations previously received in that said accumulation period to thereby provide at an output thereof a sequence of photodetector combination indicator values with each of said photodetector combination indicator values in said plurality thereof being provided in a final said dwell duration contained in each said accumulation period; and providing in each said final dwell duration in each said accumulation period of each accumulation means a representation of said photodetector combination indicator value at an output of a corresponding one of a plurality of sample transfer interconnection means, said sample transfer interconnection means each having its said output electrically connected to an output bus interconnection means and an input thereof electrically connected to said output of its corresponding said accumulation means.

2. The method of claim 1 wherein said providing alternatively conductive paths between each of said photodetector means outputs and said inputs of said plurality of acceptance means results in each said acceptance means having a conductive signal path provided thereto from a then corresponding said photodetector means output during a current said dwell duration associated therewith and, in that next succeeding dwell duration thereof following, further results in each said acceptance means having a said conductive signal path provided thereto from said output of that said photodetector means next in order in said array thereof, but with that said acceptance means having a said conductive signal path provided thereto in said current dwell duration from that said output of that said photodetector means last in order in said array having, in that next succeeding said dwell duration following, a said conductive signal path provided thereto from said output of that said photodetector means first in order in said array thereof.

3. The method of claim 1 wherein said directing of electromagnetic radiation onto a said photodetector means results in that said electromagnetic radiation impinging on a photodiode and further comprises providing a photocurrent from said photodiode, conducting said photocurrent to a terminal means in a corresponding portion of a monolithic integrated circuit chip, storing a representation of said photocurrent in a capacitive means in said monolithic integrated circuit chip during a said dwell duration, and wherein said providing a sequence of corresponding photodetector output indicator values results in a photodetector output indicator value representing said stored photocurrent representation.

4. The method of claim 1 wherein said providing of conductive signal paths alternatively between each of said photodetector means outputs and said inputs of a said plurality of acceptance means through said input bus interconnection means further comprises providing only alternative portions of said conductive signal path to form each alternative conductive signal path such that one portion of each said alternative conductive signal path is common with other alternative conductive signal paths.

5. The method of claim 1 wherein said providing of a subsample transfer signal path through each of a plurality of subsample transfer interconnective means further comprises providing a controlled conductivity for said subsample transfer signal path to effectively subtract a selected portion of each said photodetector output indicator value in forming each said transfer representation.

6. The method of claim 2 wherein said providing of alternative conductive signal paths in a current said dwell duration between photodetector means outputs and acceptance means inputs is followed in the next said dwell duration by providing a differing set of said conductive signal paths in an immediately following said dwell duration between those same said photodetector means outputs and said acceptance means inputs.

7. A time-delay integration circuit for accumulating representations of samples of photodetector signals, said time-delay integration circuit having a signal subsample input and having an accumulated sample output, said circuit comprising:

an access switching means having an input region and an output region and having a control region therein by which said access switching means is capable of being directed, through electrical energization thereof, to effectively provide a conductive path of a selected conductivity between said access switching means input and output regions, said access switching means control region being adapted for electrical connection to a first source of control signals, said access switching means input region being electrically connected to said signal subsample input;

an input capacitance means having first and second terminal regions with said input capacitance first terminal region being electrically connected to said access switching means output region, said input capacitance second terminal region being adapted for electrical connection to a second source of control signals;

an accumulation switching means having an input region and an output region and having a control region therein by which said accumulation switching means is capable of being directed, through electrical energization thereof, to effectively provide a conductive path of a selected conductivity between said accumulation switching means input and output regions, said accumulation switching means control region being adapted for electrical connection to a third source of control signals, said accumulation switching means input region being electrically connected to said input capacitance means first terminal region;

an accumulation capacitance means having first and second terminal regions, said accumulation capacitance means first terminal region being electrically connected to said accumulation switching means output region, said accumulation capacitance means second terminal region being adapted for electrical connection to a first source of voltage; and an output transfer switching means having an output region and having first and second control regions therein by which said output transfer switching means is capable of being directed, through electrical energization thereof, to effectively provide a representation at said output region thereof of a signal occurring on said second control region thereof for a signal on said first control region having a value beyond a selected threshold value, said output transfer switching means first control region being adapted for electrical connection to a fourth source of control signals, said output transfer switching means second control region being electrically connected to said accumulation capacitance means first terminal region, said output transfer switching means output region being electrically connected to said accumulated sample output.

8. The apparatus of claim 7 wherein there is further provided a reset switching means having first and second terminating regions and having a control region therein by which said reset switching means is capable of being directed, through electrical energization thereof, to effectively provide a conductive path of a selected conductivity between said reset switching means first and second terminating regions, said reset switching means first terminating region being electrically connected to said accumulation capacitance means first terminal region, said reset switching means second terminating region being electrically connected to said accumulation capacitance means second terminal region, and said reset switching means control region being adapted for electrical connection to a fifth source of control signals.

9. The apparatus of claim 7 wherein said access switching means is formed of a first field-effect transistor with said access switching means control region being said first field-effect transistor gate region, and said access switching means input and output regions being said first field-effect transistor source and drain regions.

10. The apparatus of claim 7 wherein said input capacitance means is a first field-effect transistor means with said input capacitance means first terminal region being formed by said first field-effect transistor source and drain regions, and said input capacitance means second terminal region being formed by said first field-effect transistor gate region.

11. The apparatus of claim 7 wherein said accumulation switching means is a first field-effect transistor, said accumulation switching means control region is formed by said first field-effect transistor gate, and said accumulation switching means input and output regions are formed by said first field-effect transistor source and drain regions, and wherein said accumulation capacitance means is formed of a second field-effect transistor, said accumulation capacitance means first terminal region comprising said second field-effect transistor source and drain regions, and said accumulation capacitance means second terminal region comprising said second field-effect transistor gate region.

12. The apparatus of claim 7 wherein said output transfer switching means comprises first and second field-effect transistors, said first field-effect transistor source region being adapted for electrical connection to a second source of voltage, said output transfer switching means first control region comprising said first field-effect transistor gate region, said first and second field-effect transistor drain regions being electrically connected to one another, said output transfer switching means second control region comprising said second field-effect transistor gate region, and said output transfer switching means output region comprising said second field-effect transistor source region.

13. The apparatus of claim 8 wherein said reset switching means is formed by a first field-effect transistor, said reset switching means first terminating region comprising said first field-effect transistor drain region, said reset switching means second terminating region comprising said first field-effect transistor source region, and said reset switching means control region comprising said first field-effect transistor gate region.

14. The apparatus of claim 9 wherein said input capacitance means is a second field-effect transistor means with said input capacitance means first terminal region being formed by said second field-effect transistor source and drain regions, and said input capacitance means second terminal region being formed by said second field-effect transistor gate region.

15. The apparatus of claim 14 wherein said accumulation switching means is a third field-effect transistor, said accumulation switching means control region is formed by said third field-effect transistor gate, and said accumulation switching means input and output regions are formed by said third field-effect transistor source and drain regions, and wherein said accumulation capacitance means is formed of a fourth field-effect transistor, said accumulation capacitance means first terminal region comprising said fourth field-effect transistor source and drain regions, and said accumulation capacitance means second terminal region comprising said fourth field-effect transistor gate region.

16. The apparatus of claim 15 wherein said output transfer switching means comprises first and second field-effect transistors, said first field-effect transistor source region being adapted for electrical connection to a second source of voltage, said output transfer switching means first control region comprising said first field-effect transistor gate region, said first and second field-effect transistor drain regions being electrically connected to one another, said output transfer switching means second control region comprising said second field-effect transistor gate region, and said output transfer switching means output region comprising said second field-effect transistor source region.

* * * * *